United States Patent [19]
Valette

[11] Patent Number: 5,555,088
[45] Date of Patent: Sep. 10, 1996

[54] SAGNAC EFFECT OPTICAL GYROMETER HAVING A FULLY INTEGRATED STRUCTURE

[75] Inventor: Serge Valette, Grenoble, France

[73] Assignee: Commissariat A L'Energie Atomique, France

[21] Appl. No.: 256,492

[22] PCT Filed: Jan. 14, 1993

[86] PCT No.: PCT/FR93/00038

§ 371 Date: Jul. 11, 1994

§ 102(e) Date: Jul. 11, 1994

[87] PCT Pub. No.: WO93/14378

PCT Pub. Date: Jul. 22, 1993

[30] Foreign Application Priority Data

Jan. 17, 1992 [FR] France ................................... 92 00467

[51] Int. Cl.⁶ .................................................. G01C 19/72
[52] U.S. Cl. .......................................................... 356/350
[58] Field of Search ................................. 356/350, 345; 385/12, 14; 250/227.19, 227.27

[56] References Cited

U.S. PATENT DOCUMENTS

| | | | |
|---|---|---|---|
| 5,004,342 | 4/1991 | Bernard et al. | 356/350 |
| 5,093,884 | 3/1992 | Gidon et al. | |
| 5,194,917 | 3/1993 | Regener | 356/350 |
| 5,394,239 | 2/1995 | Valette | 356/345 |

FOREIGN PATENT DOCUMENTS

| | | | |
|---|---|---|---|
| 0475013 | 3/1992 | European Pat. Off. | |
| 9007349 | 6/1990 | France . | |
| 0218021 | 10/1985 | Japan | 356/350 |
| 0184417 | 8/1986 | Japan | 356/350 |
| 62-247209 | 10/1987 | Japan . | |
| 10064283 | 3/1989 | Japan . | |
| 0142317 | 6/1991 | Japan | 356/350 |
| 2223860 | 4/1990 | United Kingdom . | |

OTHER PUBLICATIONS

Interferometric Fiber Optic Gyroscope Using a Novel 3×3 . . ., Minford et al., Optical Fiber Sensors, vol. 2, No. 2, Jan. 27, 1988, Washington D.C., USA, pp. 385–392.

All–Single–Mode Fiber–Optic Gyroscope with Long–Term Stability, Bergh, et al., Optics Letters, vol. 6, No. 10, Oct. 1981, pp. 502–504.

An Overview of Fiber–Optic Gyroscopes, Bergh et al., Journal of Light–Wave Technology, vol. LT–2, No. 2, Apr. 1984, pp. 91–107.

*Primary Examiner*—Samuel A. Turner
*Attorney, Agent, or Firm*—Hayes, Soloway, Hennessey, Grossman & Hage, P.C.

[57] ABSTRACT

A Sagnac effect optical gyrometer is provided. The gyrometer includes a probe including a planar spiral optical loop having light guides for propagating two light waves from a light source. The spiral loop is formed by optical circuits integrated on a substrate. The two light waves traverse the spiral loop in respective directions opposite to each other. The gyrometer also includes a tricoupler having three parallel rectilinear guides, a central guide and two lateral guides. The lateral guides connect two ends of the light guides to respective light detecting means. The central guide is connected on one end to the light source and introduces the light waves into the light guides. The tricoupler is integrated into the same substrate as the spiral loop.

21 Claims, 8 Drawing Sheets

FIG. 9
Type 2
OIS1

FIG. 10
Type 2
OIS2

SAGNAC EFFECT OPTICAL GYROMETER HAVING A FULLY INTEGRATED STRUCTURE

BACKGROUND OF THE INVENTION

1. Field of the Invention

The present invention relates to a Sagnac effect optical gyrometer, whose physical principle is based on a relativistic effect discovered by the physicist Sagnac in 1913.

2. Description of Related Prior Art

Optical gyrometers are well known and a description is e.g. provided on pp 91 ff of Journal of Light Wave Technology, vol. Lt. 2, No. 2, April 1984.

Details will be given of the known theory and the main evolutions of such equipments with reference to the attached FIGS. 1a and 2a.

The actual probe of a Sagnac effect optical gyrometer has a ring or turn 1 traversed by light and whose two ends have a common section 2, which respectively connects them to a light source 3 and to an interference detector 4. When the light from the source 3 is injected through the common path 2 in the ring 1, said geometrical arrangement makes it possible to bring about a division thereof into two separate light waves, whereof the first "a", passes through the ring 1 in the clockwise direction and the second "b" traverses said same ring in the counterclockwise direction, the two waves being by definition in phase because they come from the same source 3. On leaving the system, the detector 4 makes it possible to observe any interference fringes resulting from the combintion of waves a and b. By design, and in the absence of any other action, the interferences between the waves a and the waves b are perfectly constructive and correspond to a strictly zero phase shift $\Delta\rho=0$.

However, if the device rotates with an angular velocity $\vec{\Omega}$ with respect to an inertial reference frame, the wave passing through the ring in the rotation direction acquires a phase lead ρ during its passage, whereas the other acquires a phase lag $-\Delta\rho$. Thus, at the exit there is a total phase shift of $2\Delta\rho$, which modifies the interference patent read by the detector 4. As the theory of the apparatus shows that the value of the phase shift $\Delta\rho$ is proportional to the vector product $\vec{A}\wedge\vec{\Omega}$ in which $\vec{A}$ is a vector, whose magnitude is proportional to the surface of the ring and whose direction is perpendicular to the plane of said same ring and $\Omega$ is the vector of the angular rotation which it is wished to measure, it is clear that the measurement of the total phase shift $\Delta\rho$ performed by the study of the modification of the said interference pattern makes it possible to obtain the value of the sought rotation $\vec{\Omega}$.

Devices for measuring an absolute rotation designed on the basis of this principle have been developed, particularly since the appearance of on the one hand laser light sources and on the other optical light conducting fibers.

As the sensitivity of a Sagnac optical gyrometer is proportional to the length of the path of the light wave, the aim has naturally been to lengthen said path, which was particularly easy with optical fibers and in this way it was possible to produce gyrometers, whose detecting probe was formed from a coil of optical fibers in several turns. More recently, consideration has also been given to a construction of optical gyrometers by making use of integrated optics and for artificially increasing the length of the single turn constituted by a light microguide, use has been made of the resonant gyrometer, whereof an example is diagrammatically shown in FIG. 2a.

Figure 2:
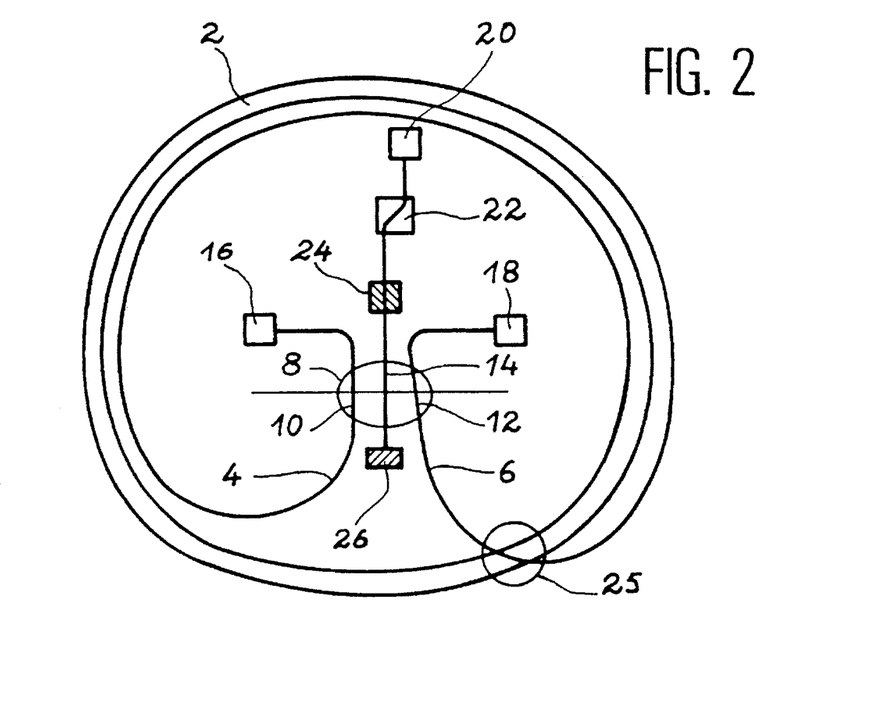
FIG. 2 shows a variant of the gyrometer of FIG. 1.
Figure 2A:
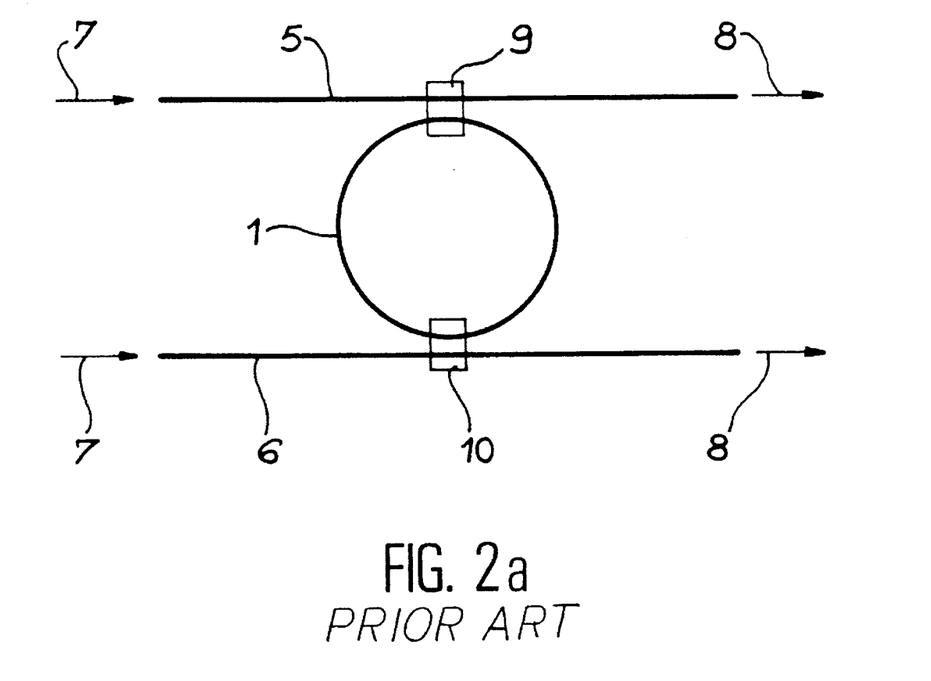
FIG. 2a shows another prior art optical gyrometer.

FIG. 2a shows the resonant ring 1 constituted by an optical microguide tangentially supplied by two light guides 5, 6, each having an entrance face 7 and an exit face 8, the light guides 5 and 6 being coupled to the resonant ring 1 with the aid of two optical couplers 9, 10. The principle of this known apparatus consists of increasing the path of the two light waves, whilst permitting the light to pass through the ring several times and examining the resulting interferences of the state of the two waves after several passages of this type. The performance characteristics of such an apparatus are consequently dependent on the number of turns which can be traversed by the light waves without excessive attenuation thereof due to propagation losses. The disadvantages of this apparatus are due to the need for the use as the light source of a laser having a considerable coherence length, which involves the use of a longitudinal monomode laser able to emit light in this form, within a wide temperature range for certain special applications of the apparatus. The construction is already difficult. Moreover, the principle of the apparatus makes it necessary to be able to accurately monitor the wavelength $\lambda_o$ of the light, which corresponds to the resonance in the ring and this is not easy to carry out using simple electronic treatments, because the aforementioned wavelength $\lambda_o$ can evolve as a function of different parameters.

It can therefore be said that although fibre optic gyrometers have arrived at a satisfactory sensitivity, the overall dimensions of the coil are prohibitive for numerous applications. With regards to integrated optics gyrometers, the need to make them operate in accordance with a resonant mode leads to very real difficulties in their practical implementation.

For the satisfactory understanding of the remainder of the present text, it is also necessary to develop a number of considerations on a useful accessory known since 1980 and which, in optical gyrometers, makes it possible to obtain operating conditions corresponding to their maximum sensitivity.

Thus, optical gyrometers usually have a completely symmetrical structure with respect to the ring traversed by the light. This is certainly the case with integrated circuit gyrometers and consequently in the absence of any rotary component, the phase shift between the rotating and contrarotating waves is zero. Therefore these apparatuses are two wave interferometers and the light intensity I collected at the exit of the passage in the optical ring is in the form $$I = I_o \cos^2 \Delta\rho/2$$

in which $\Delta\rho$ is the phase shift between the two waves.

If as a result of a rotation imposed on the apparatus and which it is wished to accurately measure, the expression $\Delta\rho$ varies by $\delta\rho$, it is possible to write:

$$\begin{aligned} dI &= 2 I_o \cos \Delta\rho/2 \sin \Delta\rho/2 \, \delta\rho \\ &= I_o \sin(\Delta\rho)\delta\rho \end{aligned}$$

This shows that when the phase shift between the two waves $\Delta\rho$ is zero, this also applies with respect to dI and the sensitivity $dI/d\rho$.

However, $dI/d\rho$ is at a maximum if $\Delta\rho=\pi/2$, $dI/d$ precisely representing the sensitivity of the apparatus, because it is the output intensity variation level related to the phase shift variation level.

It can be gathered from the above remarks that it is highly desirable for obtaining the optimum sensitivity of the apparatus to delay one of the waves by π/2 compared with the other.

In order to solve this problem, it is conventional practice to make use of the fact that light does not have an infinite velocity and takes a time T to pass through the optical ring. By placing a phase modulator in an asymmetrical position on the ring, it is consequently possible to act differently on the two waves passing through it in opposite directions and to delay one by Δρ compared with the other. For this purpose it is merely necessary to place the modulator at the entrance for one wave, which corresponds to the exit for the other. If the modulator frequency is well calculated, i.e. if it is f=2/τ, it can be demonstrated that it is possible to perfectly produce a non-reciprocal effect in the light duct, which leads to the following advantages:

1) the readings are made by positioning at the maximum sensitivity point of the apparatus for the lowest possible modulation amplitude value;
2) the response of the system has a term at the modulation frequency f proportional to sin δρ, (δρ being the phase variation introduced by the rotation).

It is consequently merely necessary to perform a synchronous detection of the signal at the frequency f to obtain a reading of the apparatus under excellent signal-to-noise ratio conditions.

The above considerations concerning the interest of a modulator placed on the light ring and which have been usefully given before providing the following specific description are well known and this is confirmed by Journal of Light Wave Technology, vol. LT, No. 2, April 1984, referred to hereinbefore, as well as the article "All-single-mode fibre-optic gyroscope with long-term stability", published on p 502 ff of Optics Letters, vol. 6, No. 10, October 1981.

Such modulators, optionally produced in integrated optics with an electrooptical material have been described in the article "An overview of fibre-optic gyroscopes", Journal of Light Wave Technology, vol. LT2, No. 2, April 1984, pp 91 to 107.

The aforementioned phase shift function of one of the "rotating" waves compared with the other "counterrotating" waves has been brought about by a tricoupler placed at the entrance of said spiral and which is much simpler to produce than the modulator described hereinbefore. Such constructions are, however, limited to fiber gyrometers for which pronounced miniaturization is impossible.

If it is wished to obtain a reliable and robust miniaturized gyrometer at a reduced price as a result of mass production, the solution of optical integration is the only one which can be envisaged at present.

This is the way taken by the Japanese document JP-A-62 247 209 published on 28.10.1987 and which effectively describes an optical gyrometer probe, whose wave guide is an integrated spiral in the form of helical path on a substrate. At the entrance of said spiral there are a laser diode serving as the light source and a polarizer, whilst at the exit a detector is provided. A modulator is positioned on the spiral in the vicinity of one end. However, in said construction, only the actual waveguide constituting the spiral is integrated onto the substrate, which limits the miniaturization possibilities for the apparatus and its mass production possibilities.

With regards to the prior art in connection with integrated optics gyrometers and spiral probes, reference can more particularly be made to the following documents:

EP-A-475 013, published subsequent to the French priority date of the present application, reveals the association of an integrated structure tricoupler and a spiral probe, apparently produced by non-integrated, optical fibers.

Japanese patent JP-A-10-064 283 reveals a gyrometer having a probe in the form of an integrated spiral with a direct intersection of the waveguides of the spiral.

Japanese patent JP-A-62-247 209 describes an integrated spiral gyrometer, but in which the intersection structure of the guides of the spiral is not integrated.

SUMMARY OF THE INVENTION

The present invention relates to a completely integrated, optical gyrometer having a tricoupler and which solves in simple manner the previously described disadvantages of prior art equipments.

This Sagnac effect optical gyrometer has a probe constituted by an optical loop in the form of a planar spiral produced with the aid of optical circuits integrated on a substrate and comprising light guides for the propagation of the two light waves coming from a light source and in each case passing through the spiral in opposite directions, the two ends of the guides of the spiral being linked with means for introducing two light waves into the spiral and for the detection of each of them when they leave the spiral, the connection of the ends of the light guides to the light source and the detection means being brought about by a tricoupler having three parallel, rectilinear guides integrated onto the same substrate as the spiral and whose central guide is connected to the light source and whose two lateral guides are in each case connected to a detector, the characteristics of the tricoupler being chosen in such a way as to produce between the two light waves which pass through the optical loop, the equivalent of a phase shift in the inoperative state which is as close as possible to π/2, characterized in that the central guide (14) of the tricoupler (8) is provided at its end opposite to the light source with an absorbent structure (26) for checking and/or eliminating the residual guided light at the exit from said central guide. Thus, the two light signals passing out of the lateral guides of the tricoupler are in the form: $I_1=A+B \cos \rho + C \sin \rho$ and $I_3=A/B \cos \rho - C \sin$ and their difference $(I_1-I_3=2 C \sin \rho)$ proportional to sin is the equivalent of a phase shift induced by the rotation of the system.

As can be seen, the essential characteristic of the present invention is that the gyrometer is produced with an integrated optical structure and that the phase shift function of the rotating wave compared with the counterrotating wave is brought about, no longer by a modulator, but by a tricoupler which, located at the entrance of the two ends of the guides of the spiral, is used both for bringing about the phase shift function and the introduction of light into the system. Moreover, according to the invention, the spiral of the light guide and the tricoupler are integrated together on the same substrate, which permits a complete miniaturization of the apparatus and a mass production thereof. Thus, said apparatus combines the advantages inherent in the use of a probe having a large number of turns and a modulator able to operate at maximum sensitivity, all this taking place in an integrated optics construction.

However, although the solution consisting of producing the light probe of the gyrometer with the aid of a spiral light duct leads to remarkable advantages, it still gives rise to a basic difficulty due to the fact that one of the end ducts of the spiral (entrance or exit) must necessarily pass beyond or clear the group of turns of the loop in order to reach the other light duct on their common part. The technical problem caused by this clearing effect is, in an integrated structure, a real problem, which is solved by the invention in the following way.

In a preferred embodiment of the gyrometer according to the invention, the clearing of the turns of the loop by the entrance or exit duct of the spiral is brought about in the form of an upper or lower passage in the manner of a bridge, by superimposing two crossed, guiding structures, whereof the lower structure, constituted by the actual spiral, is optically coupled to the upper clearing structure by two couplers located on the entrance or exit end respectively on either side of the waveguides of the spiral.

In this embodiment, the clearing of the group of turns of the spiral by one of the light guides is brought about by an upper or lower passage in the manner of a bridge, which receives and transmits the luminous energy by means of two optical couplers. When the two guiding structures are identical, the two couplers used are simple couplers operating by juxtapositioning two optical guides. When the guiding structures are different, which leads to different propagation speeds in these two structures, it is advantageous and possibly indispensable to use couplers associated with gratings in order to bring about the wave velocity matching.

The interest of placing, in accordance with the invention, an absorber on the central branch of the tricoupler more particularly results from the following considerations.

The key problem in the construction of the optical gyrometer is largely linked with the noise which may be caused by parasitic interference systems. In theory, gyrometers using a non-reciprocal physical effect, namely the Sagnac effect, are free from the influence of external parameters such as the temperature, stresses, pressure fluctuations, etc., which are reciprocal by their very nature. This is true when using well known, favorable architectures and if certain parasitic optical phenomena can be minimized. Several of the latter are known to be extremely harmful. These are the backscattering of light into the light guide (fiber or integrated optical microguide) and parasitic reflections on coupling interfaces (connection with the light source, connection with the fibers, etc.).

In general terms, any noise produced by interference between the measuring light beams and the parasitic light does not obey reciprocity and leads to fluctuations of the output signals, which cannot be separated from the variations provided by the quantity to be measured.

However, these fluctuations are dependent on external parameters and cause drifts which become more prejudicial as they very rapidly reach much higher values than those of the signals to be detected. This is due to the weakness of the measuring signals in the Sagnac effect and the fact that the parasitic noise is governed by the product of the amplitudes of the parasitic light and the signal guided light.

Even if the intensity of the parasitic light is very weak (e.g. −60 dB or $10^{-6}$), the product parasitic light amplitude (which will therefore be 10−3) guided light amplitude can rapidly exceed the value of the signal. Therefore it is vital to eliminate all parasitic light in an integrated optics fiber gyrometer. This is particularly difficult in integrated optics gyrometers for the reasons given hereinafter.

It is in fact a planar structure, where a non-negligible proportion of the parasitic light can be trapped in the same plane as the signal waves.

This is more particularly true for light passing out of the central microguide of the tricoupler, which cannot be cancelled out. This is not really parasitic light due to imperfections of the apparatus, but the effect on the noise level is identical and becomes more prejudicial as the intensity level of said light from the central guide is much higher than that of the parasitic light produced by structural imperfections.

It is therefore vital to attenuate it to the greatest possible extent. This is also true to a lesser extent for light generated towards the outside by the microguides of the spiral, which when trapped in the planar structure can recombine with adjacent microguides and produce in the same way time-fluctuating interference signals.

In both cases, the effects are amplified by the sought miniaturization in integrated optics gyrometers.

Thus, the distances involved between the output of the central guide of the tricoupler and the loops of the spiral will be approximately 1 mm or a few mm. The distances separating each loop of the spiral will be a few dozen microns only. These distances are obviously much smaller than those involved in conventional fiber gyrometers.

The combination of the two above effects (planar guidance and small interaction distances) makes it even more vital to completely eliminate parasitic light by the installation of appropriate absorbers.

The invention will be better understood from reading the following description of non-limitative embodiments of an integrated optics gyrometer, which has structures for clearing the turns of the spiral by one of the conductors and an input tricoupler. The following description is given with reference to the attached FIGS. 1 to 18, wherein:

BRIEF DESCRIPTION OF THE DRAWINGS

FIGS. 8A to 8E illustrate different stages in the production of the structure of FIG. 8; FIGS. 8A, 8C and 8E are sectional views while FIGS. 8B, 8D and 8F are plan views.

DETAILED DESCRIPTION OF PREFERRED EMBODIMENTS

Figure 1:
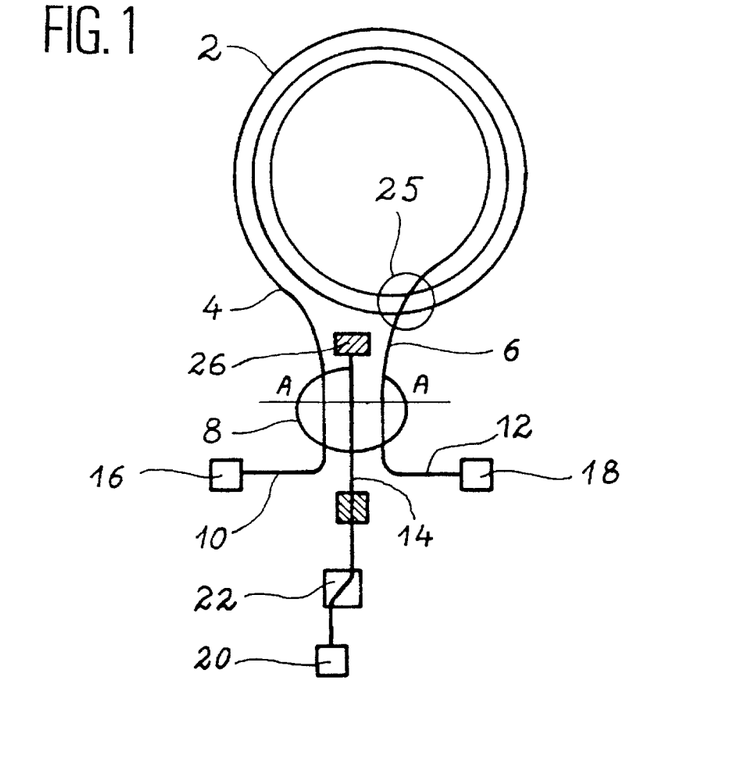
FIG. 1, is a diagrammatic plan view of, the optical gyrometer according to the invention.
Figure 1A:
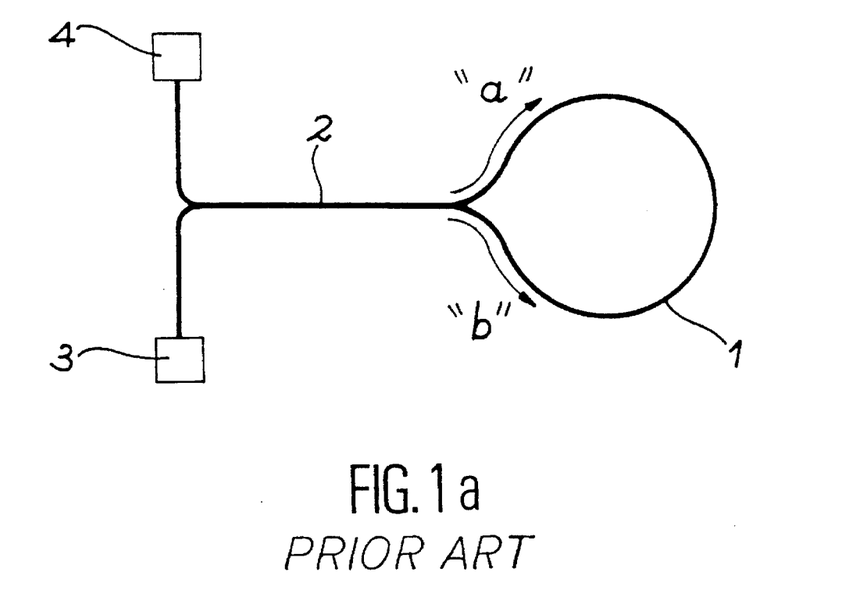
FIG. 1a shows a prior art optical gyrometer.

FIG. 1 diagrammatically shows the general architecture of an integrated optics gyrometer according to the invention. Essentially said gyrometer comprises a spiral 2 of light guides integrated onto a substrate and having two ends 4 and 6 for joining to the exterior. According to the essential feature of the invention, said junction to the exterior is provided by the tricoupler 8 constituted by three linear guides which are in parallel over the necessary interaction length $L_i$. To permit a correct energy exchange between these three guides 10 and 12 for the outer guides and 14 for the central guide, between them is provided a spacing of less than 10 micrometers and usually between 1 and 5 micrometers. With respect to the optimum interaction distance $L_i$, it is calculated so as to optimize the coupling coefficient C between the three linear, parallel guides 10, 12 and 14 and consequently the amplitude of the detected signal.

As can be seen in FIG. 1, which is a plan view of the apparatus, the two outer guides 10, 12 of the coupler 8 are respectively connected to the entrance 4 and the entrance 6 of the spiral 2. The guides 10 and 12 are also connected to two light detectors 16 and 18. The central branch 14 of the tricoupler is supplied with light by a light source 20 having a weak coherence. This light source can be of a random nature provided that it satisfies the above condition, but it is particularly advantageously constituted with the aid of a superradiant diode.

The above-described elements are necessary and adequate for the operation of the gyrometer according to the invention. However, they are advantageously supplemented at the entrance or input by a spatial filter 22 and a polarizer 24 for obtaining a polarization of the light, as well as by an absorber 26 detecting the luminous flux thereof which remains following the coupling between the three guides 10, 12 and 14, so that it is possible to check and absorb the luminous energy possibly remaining at the end of the light guide 14 of the tricoupler 8.

FIG. 2 shows a special embodiment of the gyrometer according to the invention, in which the tricoupler 8 and the accessories connected thereto are located within the spiral 2, so that the latter in certain cases allows a greater miniaturization of the apparatus. In FIG. 2, the components of the gyrometer carry the same reference numerals as in FIG. 1 and will not be described in detail again.

The spatial filter placed at the entrance of the gyrometer makes it possible to filter the guided mode avoiding the transporting of parasitic modes due to a poor injection of light into the guide. It is of a known type and can in particular be constructed in accordance with FR 90 07349 of 13.6.1990.

According to the invention, the light guides constituting the spiral 2 of the gyrometer can be advantageously protected by absorbing structures preventing any communication and exchange of light energy between the different guides of the spiral.

These absorbing structures can be constituted by a metal coating, which may or may not be covered by dielectric, in structures of the type $Si/SiO_2/Si_3N_4/SiO_2$. The thickness of the metal is not critical and is approximately 50 to 500 nanometers. In the case of such a structure, the metal is directly deposited on the high index coating constituting the core and on either side of the microguide core.

In structures of the type $Si/SiO_2/$high index doped $SiO_2/SiO_2$, the metal coating is usually directly deposited on the high index coating $SiO_2$ on either side of the microguide core. The desired geometrical shape for the metal coating is obtained by etching the metal and by the lift-off method. The thickness of the metal can be small and is advantageously 5 to 20 nanometers, as a function of the metal used. The thus produced absorber is advantageously covered with a coating of $SiO_2$ or a dielectric.

Figure 3:
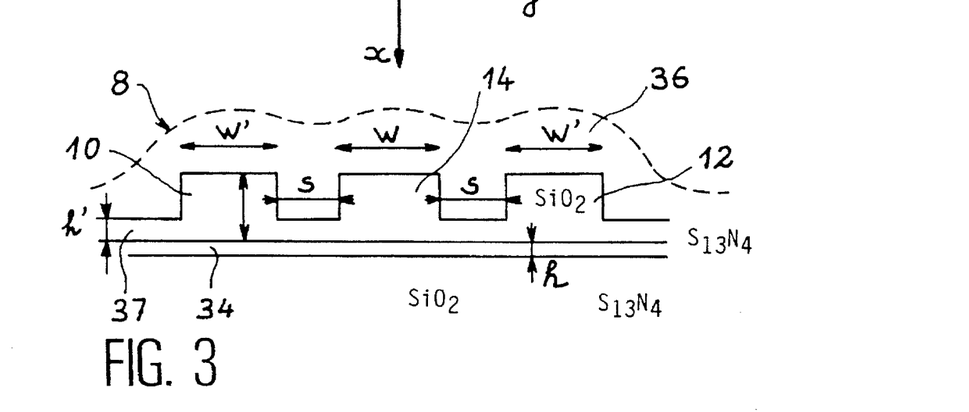
FIG. 3 is a sectional view of an embodiment of the gyrometer tricoupler.
Figure 4:
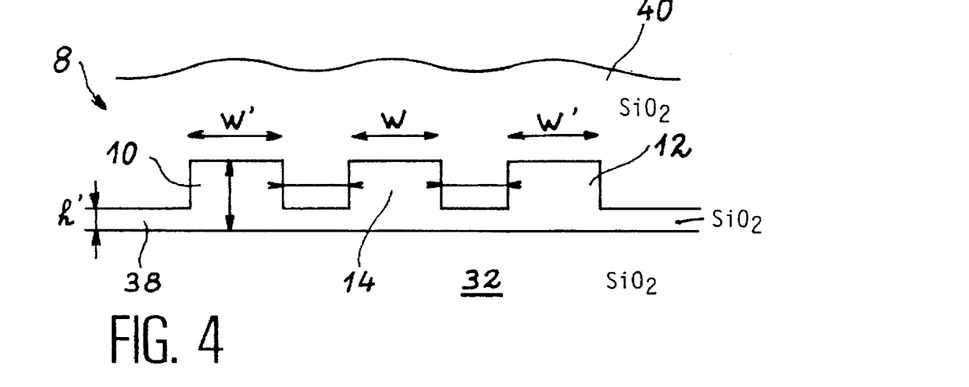
FIG. 4 is a sectional view of another embodiment of the gyrometer tricoupler.

With reference to FIGS. 3 and 4, an embodiment of the tricoupler 8 according to the invention will be described on the basis of two different optical integration structures, shown in elevation in the vertical plane AA of FIGS. 1 and 2.

FIG. 3 shows a possible construction of the tricoupler 8 in the known $Si/SiO_2/Si_3N_4/SiO_2$ structure. In the drawing can be successively seen a substrate 3 surmounted by a silica coating 32, then a silicon nitride $Si_3N_4$ coating 34 constituting the core of the guiding structure and which has a thickness h. According to the invention, it is surmounted by the actual tricoupler 8 having two $SiO_2$ external guides 10 and 12 and one $SiO_2$ internal guide 14. In this embodiment, the guides 10, 12 and 14 are formed by etching the upper $SiO_2$ coating without touching the silicon nitride core 34. The assembly can be optionally covered by a dielectric coating 36 with a refractive index n, such that n is smaller than $nSiO_2$. The guide core coating 34 is advantageously covered in the planar portion of thickness 37 with a height h' of $SiO_2$. The latter can however be zero, i.e. non-existing. As the tricoupler 8 according to the invention must be symmetrical, the two extreme guides 10 and 12 have the same width W' and the central guide W can optionally have a different width. In practice, it is easier to fix W=W' and to produce the three guides 8, 12 and 14 with a single width.

As a function of the $Si_3N_4$ thickness h, which varies from 0.4 to 0.2 micrometer (monomode condition in direction x), the height p of the guides is such that:

0.3<p<5 micrometers.

The value of h' permits a greater freedom of choice with respect to the widths W and W', without leaving the transverse monomode operating conditions (in accordance with y). In particular, if h'=0 and $hSi_3N_4$=0. 16 micrometer, W,W'<1 micrometer, so as to have a transverse monomode operation, which is a low value. In practice, h' will be between: 0≦h'<3 μm<h.

The covering by a dielectric 36 of index $n<nSiO_2$ plays an equivalent part to the remaining thickness h'. As n is smaller than $nSiO_2$, it ensures confinement in all cases. In practice and for reproducibility reasons, it is given an infinite thickness $W_D$, i.e. greater than the penetration thickness of the evanescent waves (approximately 1 to 6 micrometers).

On now referring to FIG. 4 a description will be given of an embodiment of the tricoupler 8 in an integrated structure of the type $Si/SiO_2/$doped $SiO_2/SiO_2$. FIG. 4 shows the corresponding elements to FIG. 3, namely the silicon base substrate 30, the $SiO_2$ coating 32 and the three tricoupler guides 10, 12 and 14. The difference compared with the structure of FIG. 3 is that the three guides 10, 12, 14 are directly formed by etching the high index silica coating 38 obtained by doping with the aid of ion exchange.

In this structure, the height h of the guides is such that 1.5<h<10 micrometers and the height h' of the high index coating 38, outside the actual guides, is such that 0<h'<4 micrometers. In this structure, the assembly is covered with a doped or undoped SiO coating 40, provided that the index of the core of the guide is higher.

In order that such a tricoupler functions in an optimum manner, it is necessary to define the optimum interaction length Li between the guides in order that the light exchanges from one to the other take place correctly. This interaction length is dependent both on the parameters S (distance between two adjacent guides) W and W' (width of the guides 10, 12 and 14) and the refractive indexes of the components of the structure. The general relation defining said optimum interaction length is complex and the solution is chosen so as to render at a maximum level the luminous energy on the extreme guides 10 and 12 following an outward and return path of the light through the spiral. In exemplified manner, the following quantities can be given.

In a structure according to FIG. 4 and with the following parameters:
h=2 μm, h'=0.8 μm, $\Delta n(n_{doped\ SiO_2} - n_{SiO_2}) = 10^{-2}$
W=W'=6 μm, S=2 μm, the value of the length $L_i$ is;
$L_i$=2700 μm.

If, using the above values, choice is made of W=W'=6 micrometers and S=3 micrometers, said optimum optical length is only 5200 micrometers.

However, it is of interest to note that this coupling length $L_i$ is not a very critical parameter and that fluctuations of approximately 10% around theoretical values are not prejudicial to the satisfactory operation of the gyrometer.

According to the invention, the guides of the spiral 2 are produced in integrated optics using all possible waveguide types such as e.g. the structures: $SiO_2/Si_3N_4/SiO_2$, $Si/SiO_2/$doped $SiO_2/SiO_2$, glass doped by ion exchange, $LiNbO_3$, etc. In other words, the choice of a particular waveguide type for producing the gyrometer of FIGS. 1 and 2 does not really form part of the present invention and the expert will choose as a function of his knowledge of the materials, the most appropriate waveguide type.

In both FIGS. 1 and 2 is shown at 25, the clearing zone for the turns of the spiral 2 of one of the system light guides (entrance or exit). The realization of said zone 25 will now be described.

Figure 5:
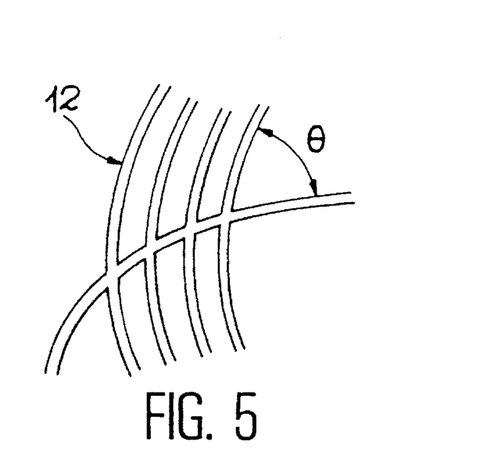
FIGS. 5 & 6 are possible coplanar intersection diagrams between the microguides of the input duct and those of the spiral.
Figure 6:
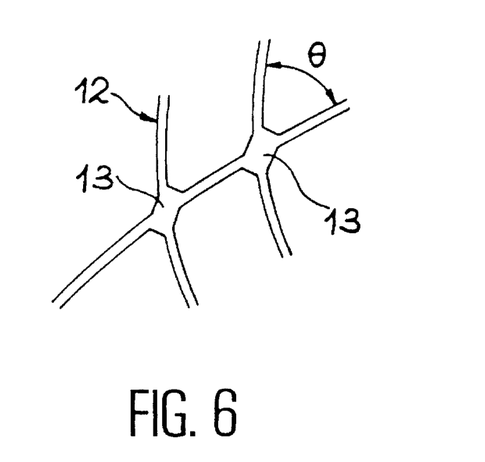

FIGS. 5 and 6 show planar structures for clearing the turns of the loop 2 of the spiral by the entrance or input or exit or output guide by direct, coplanar intersection of the light guides in the plane of the loop. The intersection angle θ of the input or entrance conductor with the turns of the spiral 2 is preferably greater than 10° in order to avoid parasitic light which, when the angle is too small, can wander in a direction which is not the desired direction and thus give rise to interference prejudicial to the exploitation of the results by the detectors 16, 18. The coplanar intersection configuration of FIG. 6 having a light guide block 13 at each intersection between two guides makes it possible to attenuate the aforementioned effect. Moreover, as the device of FIGS. 1 and 2 uses a source 20 having a limited coherence length, e.g. approximately 50 micrometers, the parasitic light cannot interfere with the signal. This leads solely to a constant noise level. This is also true in general terms as soon as the coherence length is below the path difference between the incident wave and the parasitic waves.

As has been explained hereinbefore, the interest of the spiral structure 2 of the gyrometer probe of FIGS. 1 and 2 is that it is possible in an integrated structure to significantly increase the sensitivity as a function of the number o turns without it being necessary to use a resonant mode operation, which would impose operating constraints which are often difficult to respect.

Figure 7:
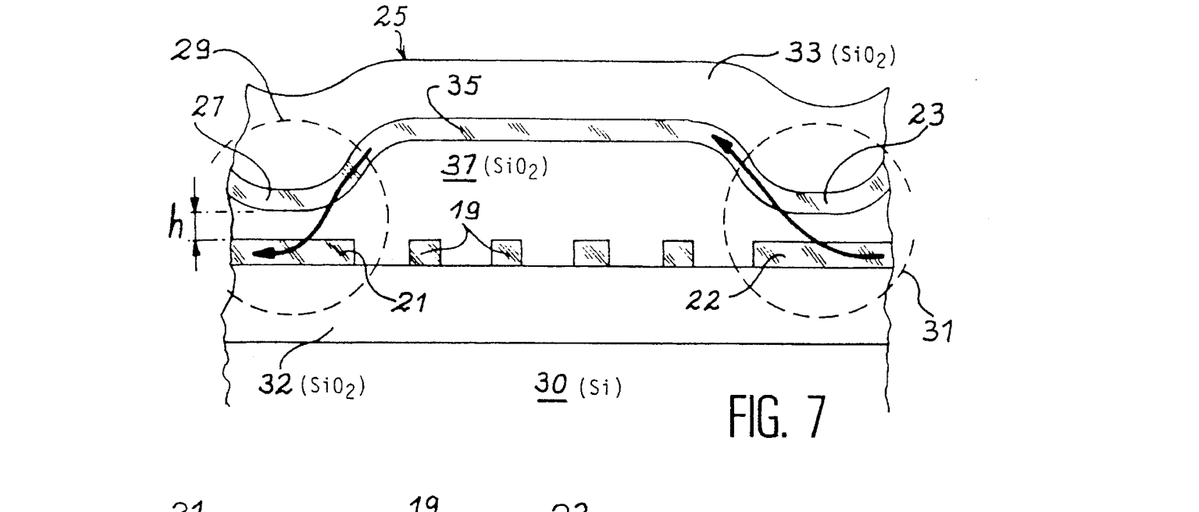
FIG. 7 illustrates one possible embodiment for the clearing of the turns of the guide constituting the spiral by the input conductor.
Figure 8:
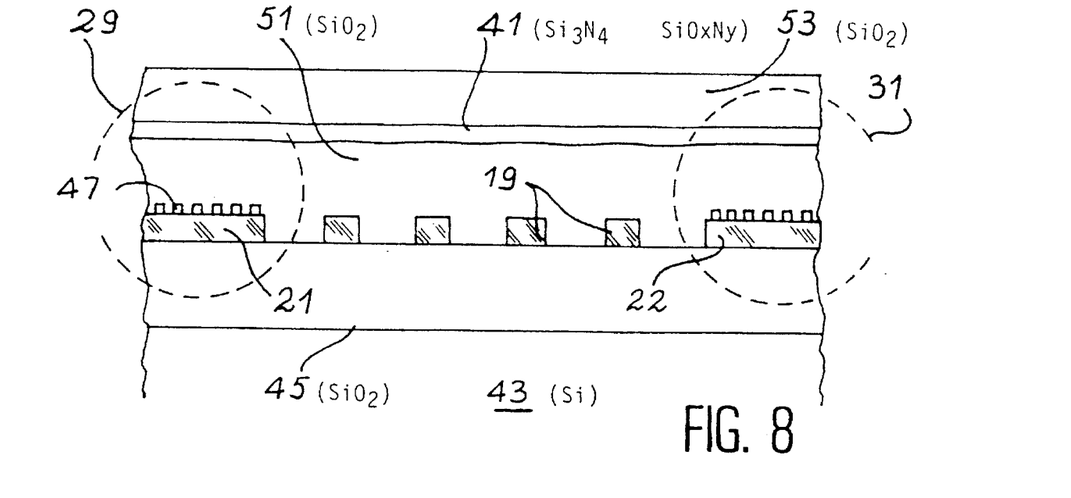
FIG. 8 illustrates another possible structure for the clearing of the turns by the input conductor.

FIGS. 7 and 8 make it possible to describe possible realizations of the difficult passage 25 of FIGS. 1 and 2. In FIGS. 7 and 8, the passages described are upper clearing passages in the manner of bridges, but this does not represent a limitation and solutions consisting of using lower passages would have equally good performance characteristics.

In the case of FIG. 7, in the difficult passage zone 25 there is a superimposing of two identical guiding structures in order to bring about the desired clearance bridge. The guiding structure used in this example is a structure of the type $Si/SiO_2/$doped $SiO_2/SiO_2$, but could also have a different structure.

In the case of FIG. 7, the base structure has the silicon coating 30 surmounted by a silica coating 32 and the various doped $SiO_2$ guides. Among the latter there are the guides 19 of the actual spiral 2 and the two lower blocks 21 and 22 of the couplers 29 and 31 of said first structure with the upper structure surmounting it. Said upper structure has a silica coating 33, a doped silica light guide 35 and the coating 37, which is common to the two structures, is made from silica. FIG. 7 shows the coupler 29 constituted by the block 21 and the part 27 immediately above the microguide 35 and the coupler 31 located on the other edge of the spiral and constituted by the block 22 and the part 23 of the microguide 35. The continuous line arrows symbolize the way in which the light passes in the coupler 31 from the block 22 to the guide 35 and in the coupler 29 from the guide 35 into the block 21. This embodiment permits the clearing of the difficult zone 35 without causing any problems with respect to the propagation of light in the guides of the spiral 2.

Figure 7A:
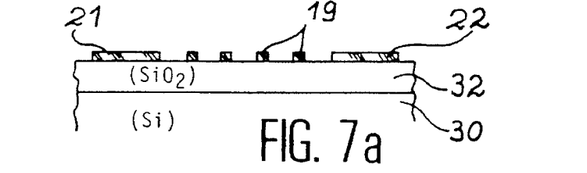
FIGS. 7a to 7g illustrates different stages in the production of said clearing structure shown in section in FIGS. 7a, 7c, 7e and 7g and in plan view in FIGS. 7b, 7d and 7f.
Figure 7B:
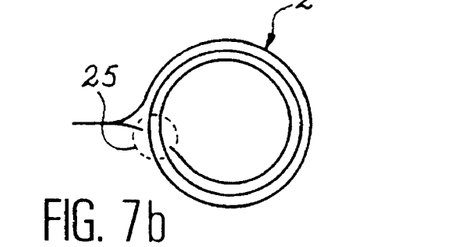

FIGS. 7a to 7g show in explanatory form the main stages of the process for preparing the clearing bridge of FIG. 7. On a silica-coated silicon substrate are deposited, as shown in FIG. 7a, the blocks 21, 22 of the future couplers, as well as the spiral guides 29 of the spiral 2. At this stage, the system is as shown in plan view in FIG. 7b.

Figure 7C:
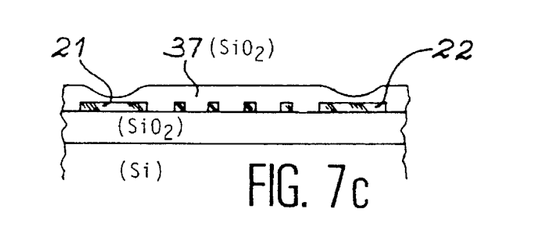
Figure 7D:
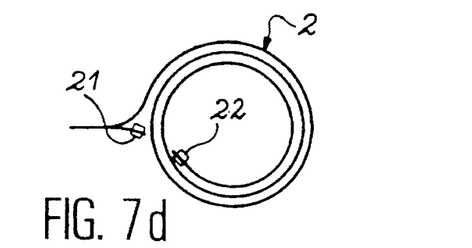

The following stage consists of depositing by plasma-assisted chemical vapor deposition, followed by chemical etching, the intermediate silica coating 37. This coating has above the blocks 21, 22 notches in which will be subsequently located the light duct 35. The plan view of the gyrometer corresponding to the state of FIG. 7c is shown in FIG. 7d.

Figure 7E:
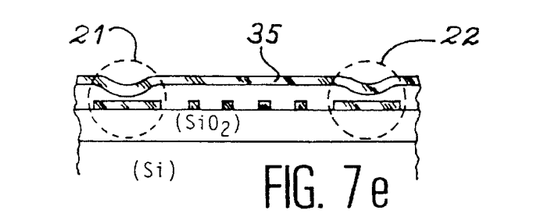
Figure 7F:
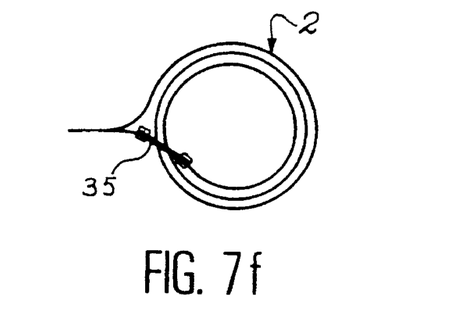

The following phase (FIG. 7e) consists of depositing on the preceding structure the core of the guide structure 35 and etching said core through a mask. The material of the core 35 is doped silica. The plan view of the same device in this state is shown in FIG. 7f.

Figure 7G:
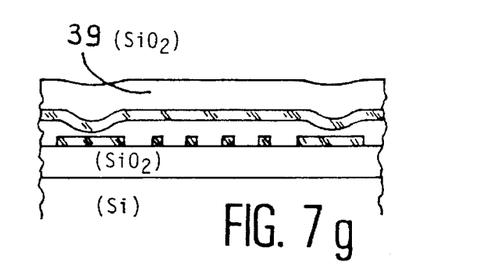

The following stage consists of the deposition of the final coating or superstrate 39, as shown in FIG. 7g. This coating is of $SiO_2$, also being producible by plasma-assisted, chemical vapor deposition.

As is known to the expert, the thicknesses given to the different coatings are dependent on the desired effective indexes for each of them and the need to obtain a correct passage of the evanescent wave at the couplers 29 and 31.

With reference to FIG. 8, a description will now be given of another realization of the clearance zone 14 in the case where the latter is obtained with the aid of two superimposed, but non-identical structures. In this case, the coupling between the lower structure and the upper structure is in general very small, because the velocities of the guided light waves in each structure are different. However, in order to ensure that the light passage does take place between these two structures, it is necessary to constitute the couplers by a grating having a spacing p such that:

$$\beta_1 + \frac{2\pi m}{p} = \beta_2 \text{ with}$$

$$\beta_1 = \frac{2\pi n_1}{\lambda_o} \text{ and } \beta_2 = \frac{2\pi n_2}{\lambda_o}.$$

$\beta_1$ and $\beta_2$ being propagation constants of the modes of the structures of the two upper and lower guides, p the spacing of the grating, m the order of diffraction and $n_1$ and $n_2$ the refractive indexes of the cores 19 and 41 of the upper and lower guides. If account is taken of the preceding conditions, the coupling between the upper and lower structures is excellent and makes it possible to clear the zone 25. In the example of FIG. 8, the lower structure is of the type $Si/SiO_2$/doped $SiO_2/SiO_2$ and that of the upper guide is of the type $Si/SiO_2/Si_3N_4$ (or $SiO_xN_y$)/$SiO_2$, which can be seen in FIG. 8 where the lower substrate 43 is of silicon and is surmounted by a first silica coating 45. On the surface of said coating 45 are located the light guides 19 of the doped silica spiral 2, as well as the doped silica blocks 21, 22 for supporting the gratings 47, 49.

The silica coating 51 surmounting the guides 19 and the blocks 21, 22 of the couplers 29, 31 is common to the lower structure and to the upper structure. The latter comprises the actual silicon nitride $Si_3N_4$ or a $SiO_xN_y$ type compound light guide 41 and is surmounted by the silica coating 53. The gratings 47, 49 ensure the light coupling between the two aforementioned structures by means of the guiding coating 41. The structure of FIG. 8 is technologically viable on respecting, for the constants $\beta_1$ and $\beta_2$, the previously defined conditions, i.e. in particular if the thicknesses and indexes of the different guides are appropriate and coherent with the spacing p of the gratings 47 and 49.

Although the expert knows how to produce the guiding structures of FIG. 8, FIGS. 8a to 8f diagrammatically show the main stages in the production thereof.

Figure 8A:
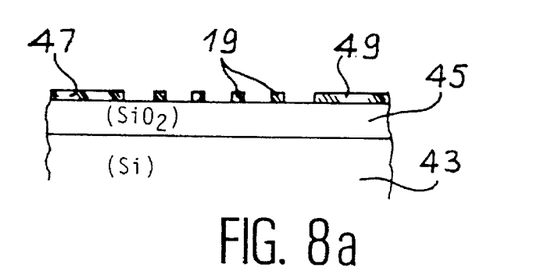
Figure 8B:
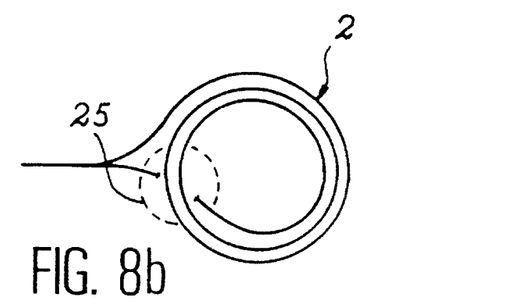
Figure 8C:
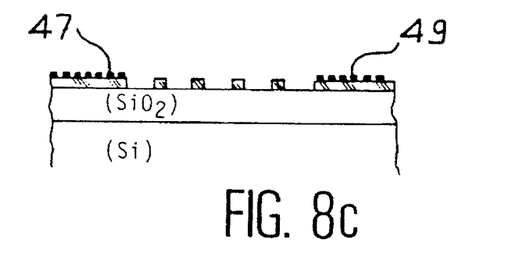

FIG. 8a shows the silicon substrate 43 surmounted by the silica coating 45 on which are etched in known manner the guides 19 and the gratings 47 and 49. At this stage the structure is shown in plan view in FIG. 8b.

Figure 8D:
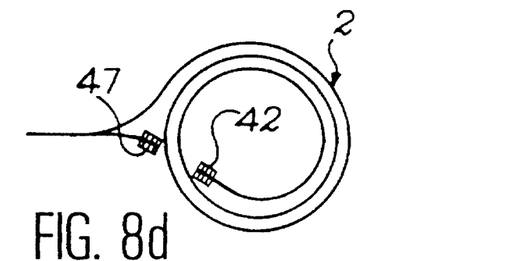

The following stage consists of producing the gratings 47, 49 by dry etching through a mask, followed by cathodic sputtering or vapor phase deposits. FIG. 8d shows the state of said structure in plan view with the gratings 47, 49 on either side of the ducts of the spiral 2.

Figure 8E:
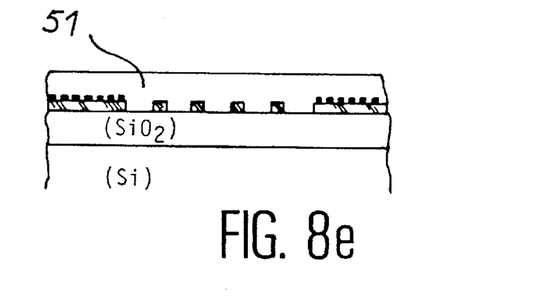
Figure 8F:
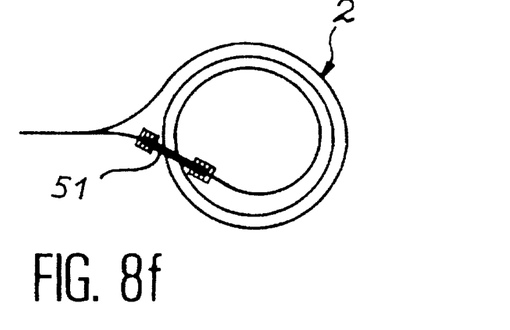

FIG. 8e shows the chemical vapor phase deposition of the intermediate silica coating 51 common to the two structures. The state of the device can then be seen in plan view in FIG. 8f. It merely has to be completed by the deposition of the core 41 of the guides 19, followed by an etching and a deposition of the $SiO_2$ superstrate. As in the example of FIG. 7, the thicknesses of each of the deposits are chosen by the expert as a function of the desired effective indexes for each coating.

FIGS. 1 and 2 have on their central guide 14 a polarizer 24, with respect to which it has already been stated that it was not strictly necessary for the satisfactory operation of the apparatus, but still brought about an interesting improvement. The following considerations will enable the expert to implement it more easily.

Polarizer 24 is advantageous for the selection of a single polarization of the light, because the light source 20 used, e.g. a superradiant diode, does not always emit a sufficiently polarized light. This polarization is obtained by covering the light guide 14 of FIGS. 3 and 4 with a dielectric coating. The thus obtained light polarization effect is based on the penetration difference 1 of the transverse electric evanescent waves (TE) or orthogonal polarization evanescent waves (TM). Thus, it is know that $1_{TE} < 1_{TM}$ for the same waveguide. Moreover, for a given metal deposited on a waveguide, the absorption $\alpha_{TM}$ is always stronger than the absorption $\alpha_{TE}$. It is therefore merely necessary to cover the light guide with a dielectric coating of thickness 1 such that $1_{TE} < 1 < 1_{TM}$.

For example, in the case of the tricoupler structure shown in FIG. 1, on choosing $W_{Si_3N_4} = 0.165$ micrometer, $1_{SiO_2}$ is approximately 0.25 to 0.40 micrometer in the most favourable case where the differential absorption ($\alpha_{TM} - \alpha_{TE}$) is maximized (as a function of the metal used Al, Au, Cr or Ti).

With reference to FIGS. 9 to 16, a description will now be given of various embodiments of absorbers used in the gyrometer according to the invention at two different locations, where they in each case correspond to one particular embodiment. The absorber which protects the light guides of the spiral 2 and which will be subsequently called the "type 1 absorber" and the absorber 26 located at the end of the duct 14 of the tricoupler 8 and which will subsequently be called the "type 2 absorber" can be produced according to the invention in any known integrated structure and namely the most commonly used structures $Si/SiO_2/Si_3N_4/SiO_2$ on the one hand and $Si/Si_2$/doped $SiO_2/SiO_2$ on the other. The two preceding structures will be designated hereinafter by the term structure 1 and structure 2.

In general terms, the types 1 and 2 absorbers can be produced both with the aid of the structure 1 and the structure 2. The expert will be able to choose the appropriate solution for the particular case. It is pointed out that the absorbers, no matter whether they are of type 1 or 2 only are optional, although being very advantageous in the invention, it would still be possible to have a gyrometer not using them.

With regards to the type 1 absorbers, they are placed around the light ducts of the spiral 2 to prevent any energy exchange between the different turns, as well as the trapping of any parasitic light produced by defects in the guides (interruption, fault in the production mask, roughness of the edges, etc.) or by the actual components, in particular by the intersecting passages 25 of one of the ends of the guide by the spiral 2.

In the type 1 integrated structure, they are constituted by a metal coating which may or may not be covered by a dielectric. The thickness of the metal forming this coating is not very critical and is generally approximately 50 to 500 nanometers. The metal is directly deposited on the high index silica coating constituting the core and on either side of the latter.

In type 2 integrated structures, the metal coating is usually directly deposited on the high index $SiO_2$ coating and on either side of the microguide core. The desired form is obtained by etching the metal or by lift-off. The thickness of the metal must be small and is advantageously between 5 and 20 nanometers, as a function of the metal used. A covering by a coating of $SiO_2$ or a dielectric material is favorable, particularly for type 1 absorbers.

Type 2 absorbers are made necessary by the fact that the optimum interaction length of the three guides 10, 12 and 14 of the tricoupler 8 does not lead to a zero light intensity at the end of the central guide 14. Under these conditions, the absorber 26 is used either for checking the power injected in light form into the spiral 2, or for eliminating the residual light intensity at the end of the duct 14. The type 2 absorbers differ from the type 1 absorbers, because their function is to absorb guided light passing out of the microguide and not parasitic light. It is therefore appropriate to place the metal coating constituting the type 2 absorber directly on the guide core or better still on the overlap coating, but at a distance from the core of said guide still permitting an interaction between the metal coating and the light. It should be noted that as the covering coating generally has an adequate thickness to ensure a total protection of the guide must be etched before the metal deposit in order to form type 2 absorbers.

In the following FIGS. 9 to 16, the absorber structures shown have coatings carrying the same reference numerals as in the previous drawings and which will not be described again. The metal coating fulfilling in practical terms the absorption function is designated 60.

Figure 9:
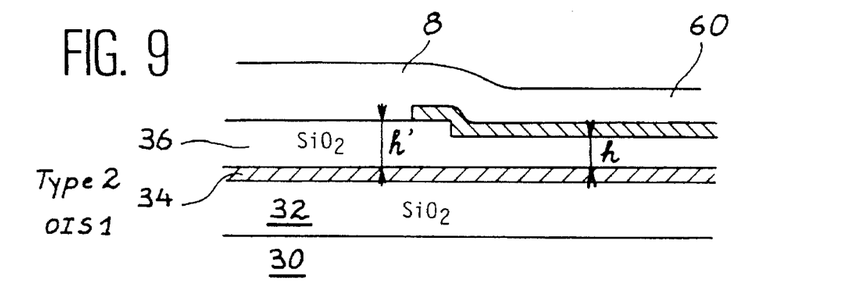
FIGS. 9, 10 and 11 and 12 illustrate several constructions of absorbers of two different types using two separate integrated structures.

FIG. 9 shows, in a 1 structure a type 2 absorber, the assembly being shown in section along the axis of the microguide 34. The metal coating 60 has a thickness of 50 to 500 nanometers, the coating 34 being of silicon nitride $Si_3N_4$ or more generally $SiO_xN_4$ with a width W for silicon nitride of 165 nanometers, a h'$SiO_2$ height of approximately 1.2 micrometers and a height h of approximately 10 to 40 nanometers. In this example, the wavelength used is 0.8 micrometer.

Figure 10:
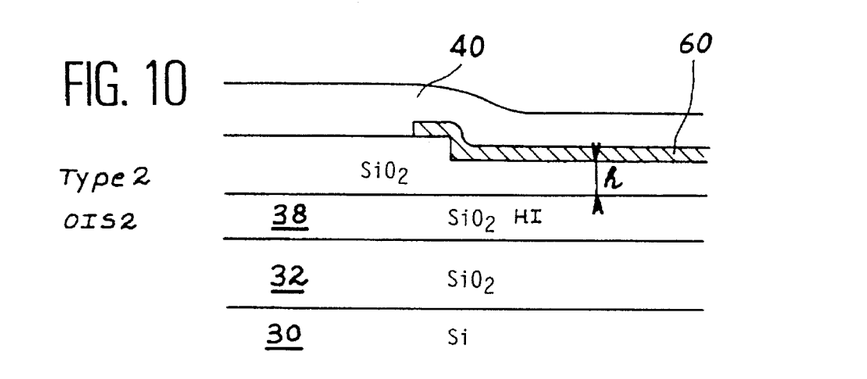
Figure 11:
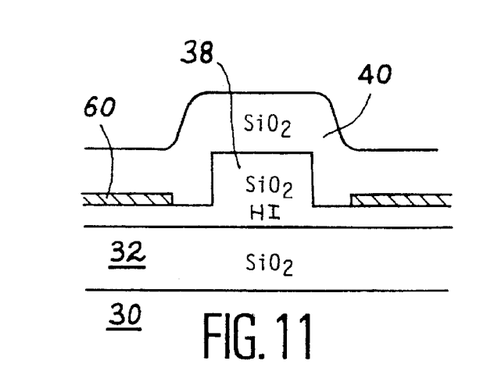
Figure 12:
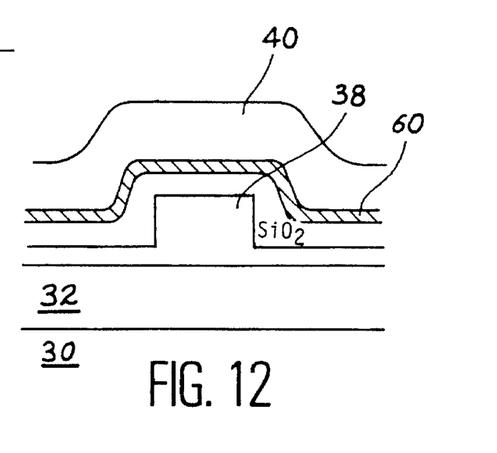

FIG. 10 also shows a type 2 absorber, but in a 2 structure. It is with this type of structure that the type 2 absorber is more useful, because the discontinuity is greater as a result of the marked penetration of the guided light in the covering coating. FIG. 10 is a sectional view in accordance with the microguide axis. In this case, the metal coating 60 has a thickness of 5 to 20 nanometers. The thickness h is less than the penetration depth of the evanescent wave of the guided mode. In all cases, the type 2 absorbers cover the actual light guide, whereas in the case of the type 1 absorbers, which must not disturb the propagation in the guide, they are placed on either side of the latter. This is shown in FIGS. 11 and 12, which represent type 2 structures and on this occasion in section perpendicular to the guide axis, with a type 1 absorber in FIG. 11 and a type 2 absorber in FIG. 12.

Figures 13, 14, 15, 16:
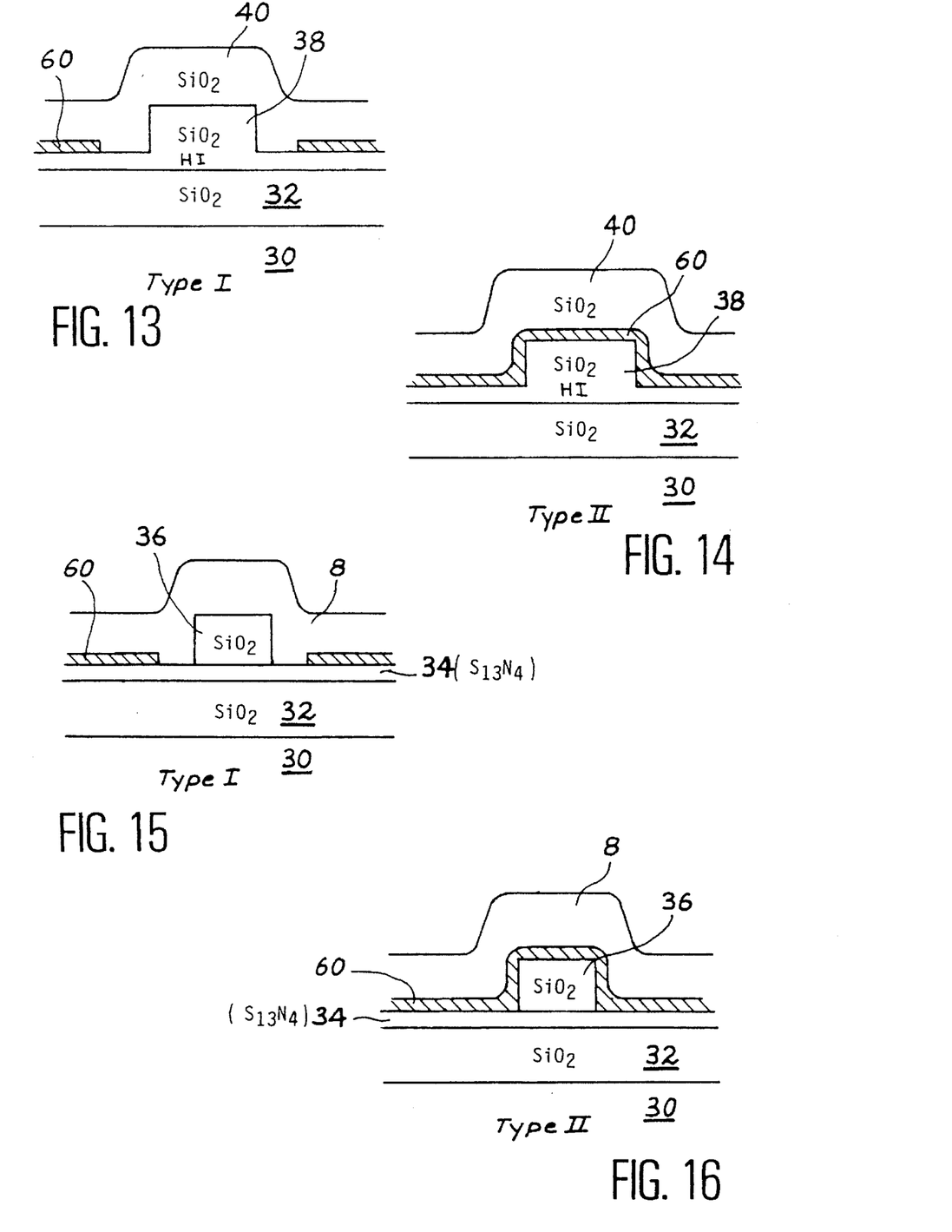
FIGS. 13, 14, 15 and 16 illustrate several absorbers of two different types, using two separate integrated structures produced at the same time.

With respect to the absorbers of a integrated optics gyrometers, the invention also relates to an embodiment making it possible to produce at the same time type 1 and type 2 absorbers using the same technological process. This is relatively interesting, because otherwise a large number of technological stages would be necessary in order to separately produce the two types of absorber. As can be seen in FIGS. 13 to 16, this result is obtained by covering the side walls of the microguide by a metal coating 60. FIG. 13 also shows a type 1 absorber in the structure 2, but in FIG. 14 there is a type 2 absorber in said same structure 2. FIGS. 15 and 16 relate to the structure 1 for producing a type 1 absorber (FIG. 15) and a type 2 absorber (FIG. 16).

Figure 17:
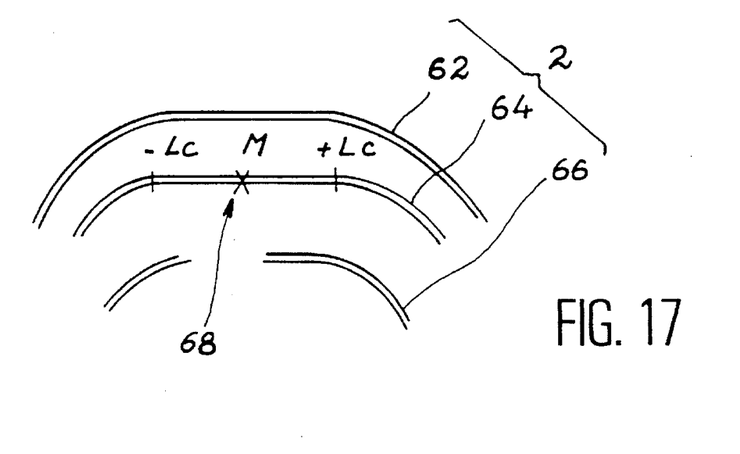
FIG. 17 illustrate an improvement to the central area of the spiral.

FIG. 17 shows a secondary, but still important improvement to the invention. FIG. 17 shows a certain number of light guides 62, 64 and 66 belonging to the spiral 2. These guides are shown in the vicinity of the centre point M of said spiral, i.e. the point reached at the same time by the rotating and counterrotating waves which pass through the turns of the gyrometer when the latter is inoperative.

Bearing in mind the coherence length $L_c$ of the light emitted by the superradiant diodes and which is approximately 30 to 100 micrometers, it is vital to avoid the production on either side of the centre point M of parasitic light and this applies over a length approximately the same as the coherence length $L_c$. In said zone, light guides 62, 64, 66, etc. must consequently be as perfect as possible. Therefore, according to the invention, it is very useful to produce them at this location in the form of a rectilinear path such as 68, which has less defects than curved sections.

Figure 18:
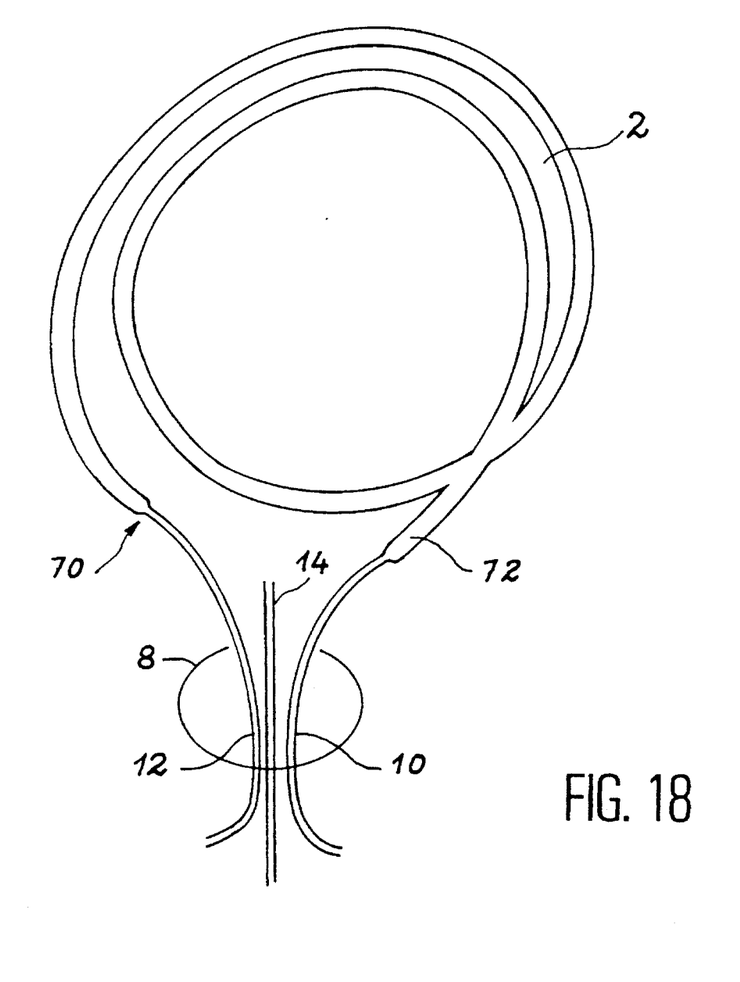
FIG. 18 illustrate an improvement to the end areas of the ducts of the spiral.

Finally, with reference to FIG. 18, a description will be given of another improved embodiment of the gyrometer according to the invention. In this case the two ends of the light ducts 12 and 14 of the tricoupler 8 are provided at their entrance into the spiral with two widened, funnel-shaped zones or tapers 70, 72. These widenings at the start and finish of the spiral 2 make it possible to bring about a sharper turn of the optical guide, without leading to the addition of correlative propagation losses.

In practice, the microguides of the tricoupler 6 are monomodal. The presence of the widening zones 70, 72 make it possible to use multimode guides after the entrance into the spiral 2 with widths of approximately 6 to 15 micrometers, whereas the current widths at the tricoupler 6 for the guides 10, 12 and 14 are roughly 3 to 6 micrometers. The fact that the microguides are multimodal in the spiral is not prejudicial, because the curvature thereof acts as a mode filter. Moreover, if the entrance and exit of each widening 70, 72 is sufficiently progressive with respect to the curvatures used (this is e.g. brought about by a widening length of approximately 20 to 1200 micrometers) there is very little conversion of the major mode towards higher order modes.

I claim:

1. A Sagnac effect optical gyrometer comprising a probe including a planar spiral optical loop having light guides for propagating two light waves from a light source, said spiral loop (2) being formed by optical circuits integrated on a substrate, said light guides of the spiral being made optically independent of one another by absorbing structure located between the guides, said two light waves traversing the spiral loop in respective directions opposite to each other, a tricoupler having three parallel rectilinear guides, said three parallel guides including a central guide means and two lateral guides, said lateral guides respectively connecting two ends of said light guides to respective light detecting means, said central guide means having two opposing ends and being connected on one end to said light source, said central guide means being for introducing said light waves into said light guides, said tricoupler being adapted to produce between said two light waves the equivalent of a phase shift in the inoperative position which closely approaches $\pi/2$, said tricoupler being integrated into the same substrate as the spiral loop, and an absorbing structure connected to the other end of said central guide for eliminating residual light exiting said central guide.

2. A gyrometer according to claim 1, wherein a clearing (25) of the turns of the loop by one of the two ends of the guides of the spiral (2) is brought about, in integrated optics, by direct intersection of the light guides in the plane of the loop with intersection angles greater than 10°.

3. A gyrometer according to claim 1, wherein the light guides have a guiding coating made from lithium niobate $LiNbO_3$.

4. A gyrometer according to claim 1, wherein light guides have a glass guiding coating whose index has been modified by ion exchange.

5. A gyrometer according to claim 1, wherein a clearing of the turns of the spiral (2) by one of the two ends of the guides of the spiral takes place in the form of an upper or lower passage in the manner of a bridge, by super-imposing two crossed guiding structures, whereof the lower structure constituted by the spiral is optically coupled to the upper clearing structure by means of two couplers located on the entrance or exit end respectively on either side of the waveguides of the spiral.

6. A gyrometer according to claim 5, wherein the two guiding structures are identical and the two couplers (29, 31) are single couplers.

7. A gyrometer according to claim 5, wherein the guiding structures are different and the two couplers (29, 31) incorporate gratings (47, 49).

8. A gyrometer according to claim 1, wherein the light source (20) is a source having a limited coherence length.

9. A gyrometer according to claim 8, wherein the light source (20) is a superradiant diode.

10. A gyrometer according to claim 1, wherein the central guide of the tricoupler (14) has, following the light source (2), at least one of the two means included in the group consisting of a polarizer (24) and a spatial filter (22) for selecting a guided mode.

11. A gyrometer according to claim 1, wherein a part of the light guides of the spiral (2) having a center point M thereof is formed by portions (68) of rectilinear guides.

12. A gyrometer according to claim 1, wherein the guides have, at the ends of the spiral (12, 14) and following the exit of the tricoupler (8), a funnel-shaped widened portion (72) for increasing the width of the guides of the spiral.

13. A gyrometer according to claim 1, wherein the light guides have a guiding coating made from lithium niobate $LiNbO_3$ doped with titanium.

14. A gyrometer according to claim 1, wherein the light guides have a guiding coating made from lithium niobate $LiNbO_3$ which has undergone a proton exchange.

15. A gyrometer according to claim 1, wherein a part of the light guides of the spiral (2) having a center point M thereof and at least a part of the light guides located on either side of the center point are formed by portions (68) of rectilinear guides.

16. A gyrometer according to claim 15, wherein all of the light guides located on either side of the center point are formed by portions of rectilinear guides.

17. A gyrometer according to claim 1, wherein the light guides have a $Si/SiO_2/Si_3N_4/SiO_2$ structure.

18. A gyrometer according to claim 1, wherein the light guides have a $Si/SiO_2/SiON/SiO_2$ structure.

19. A gyrometer according to claim 1, wherein the light guides have a $Si/SiO_2/Al_2O_3/SiO_2$ structure.

20. A gyrometer according to claim 1, wherein the light guides have a $Si/SiO_2/doped\ SiO_2/SiO_2$ structure.

21. A Sagnac effect optical gyrometer comprising a probe including a planar spiral optical loop having light guides for propagating two light waves from a light source, said spiral loop being formed by optical circuits integrated on a substrate, said light guides of the spiral (2) being made optically independent of one another by an absorbing structure located on the complete spiral, said two light waves traversing the spiral loop in respective directions opposite to each other, a tricoupler having three parallel rectilinear guides, said three parallel guides including a central guide means and two lateral guides, said lateral guides respectively connecting two ends of said light guides to respective light detecting means, said central guide means having two opposing ends and being connected on one end to said light source, said central guide means being for introducing said light waves into said light guides, said tricoupler being adapted to produce between said two light waves the equivalent of a phase shift in the inoperative position which closely approaches $\pi/2$, said tricoupler being integrated into the same substrate as the spiral loop, and an absorbing structure connected to the other end of said central guide for eliminating residual light exiting said central guide.

* * * * *